(12) United States Patent
Smith et al.

(10) Patent No.: US 11,099,097 B2
(45) Date of Patent: Aug. 24, 2021

(54) APPARATUS FOR HYDROSTATIC TESTING

(71) Applicants: Randall M Smith, Metairie, LA (US); Beau Giglio, Metairie, LA (US)

(72) Inventors: Randall M Smith, Metairie, LA (US); Beau Giglio, Metairie, LA (US)

(73) Assignee: Pressure Technologies, Metairie, LA (US)

( * ) Notice: Subject to any disclaimer, the term of this patent is extended or adjusted under 35 U.S.C. 154(b) by 0 days.

(21) Appl. No.: 16/563,521

(22) Filed: Sep. 6, 2019

(65) Prior Publication Data

US 2020/0018661 A1  Jan. 16, 2020

Related U.S. Application Data

(63) Continuation-in-part of application No. 15/407,558, filed on Jan. 17, 2017, now Pat. No. 10,428,981.

(51) Int. Cl.
*G01M 3/02* (2006.01)
*G01M 3/28* (2006.01)

(52) U.S. Cl.
CPC .......... *G01M 3/022* (2013.01); *G01M 3/2807* (2013.01)

(58) Field of Classification Search
CPC ... G01M 3/022; G01M 3/2807; F16L 55/1157
USPC ............................................. 138/90; 73/49.8
See application file for complete search history.

(56) References Cited

U.S. PATENT DOCUMENTS 1,682,879 A  *  9/1928  Wilson ............... F16L 55/1157
4,813,456 A  *  3/1989  Emmitte, Jr. ....... F16L 55/1157
                                                             138/90

* cited by examiner

*Primary Examiner* — Greg Binda
(74) *Attorney, Agent, or Firm* — Henry E Naylor

(57) ABSTRACT

An apparatus for hydrostatic testing of items containing flanged openings and which items require periodic pressure testing, such as flanged pipe sections, flanged pipelines, flanged hose assemblies, as well as other flanged equipment requiring periodic pressure testing. The apparatus is clamp-like and is comprised of multiple circular plates that are designed and arranged to hold a blind flange against the flange of the item to be tested. One of the circular plates contains a circular cavity into which the blind flange can be stored when the apparatus is not in use.

19 Claims, 11 Drawing Sheets

APPARATUS FOR HYDROSTATIC TESTING

CROSS-REFERENCE TO RELATED APPLICATIONS

This is a continuation-in-part of U.S. Ser. No. 15/407,558 file Jan. 17, 2017 now U.S. Pat. No. 10,428,981.

FIELD OF THE INVENTION

This invention relates to an apparatus for hydrostatic testing of openings in items surrounded by a flange, such as flanged pipe sections, flanged pipelines, flanged hose assemblies, as well as other flanged equipment requiring periodic pressure testing.

BACKGROUND OF THE INVENTION

In most industrialized areas of the world, vast quantities of fluids are transported, stored, handled, and processed through flanged conduits and equipment such as flanged pipelines, flanged piping, and flanged hose assemblies. For example, process and power piping and pipelines are commonly comprised of a plurality of flanged pipe sections secured together at their flanged ends with use of a suitable securing means, such as by use of a plurality of bolts or nuts and bolts. Non-limiting examples of fluids that are transported through flanged conduits and equipment include crude oils, lubricating oils, natural gas, transportation fuels, as well as a variety of petrochemical feedstock and product streams, slurries, industrial gases, food products, pharmaceuticals, etc. Further, such flanged conduits are often of considerable length and can extend for many miles over all types of geographic terrain.

A substantial fraction of pipelines today is located underneath bodies of water and are often subjected to saltwater environments. Piping and pipeline integrity and safety are of utmost concern since many of these pipelines, process equipment, and related piping in use today are continuously filled with valuable and potentially hazardous fluids, some of which can be lethal, explosive, highly flammable, or highly reactive under inordinately high pressures and temperature combinations. Consequently, sections of traditional piping, including piping manufactured for use for these pipelines, as well as related flanged equipment such as pressure vessels and heat exchangers, etc., are generally required to undergo both initial testing at the time of fabrication, alteration, or repairs and subsequent periodic hydrostatic testing. This testing is performed under the constraints dictated by the specific industry, piping system Code to which it is designed, the customer, as well as constraints that are required by various governing bodies, including in some instances sound engineering judgment. One such specification that is required is that the pressure integrity of the piping and/or pipeline and related flanged equipment is ensured before being placed into service and throughout the intended use and commercial lifetime.

Hydrostatic testing generally requires that each end of a flanged item to be tested be sealed against an applied testing pressure without leaking during the duration of the test. The flanged item to be tested is typically filled with a liquid under pressure, such as water, or in some instances an inert gas, such as nitrogen. Customarily, a blind flange of the testing apparatus is bolted onto the flange at each end of the flanged item to be tested. The connecting flanges are then typically bolted together using code required torque sequences of the bolting to ensure that at least one sealing gasket between flanges is fully energized and capable of resisting the hydrostatic end pressure during testing and any applied external loads. Depending on the size of the flange and the selected pressure, from about four to dozens of bolts per set of flanges can be required. Securing and torqueing these bolts is an extremely laborious, repetitive, and time-consuming process that can take up to several hours to one or more days to simply prepare a single flanged connection for hydrostatic testing. Therefore, there is a need in the art for an apparatus that will substantially reduce the time and costs of performing hydrostatic testing.

SUMMARY OF THE INVENTION

1. An apparatus for sealing a flanged opening, which apparatus is comprised of:

a) a circular rear plate section having an elongated slot for receiving a flange of a flanged opening to be sealed wherein said elongated slot is a U-shaped slot extending from the perimeter of said rear plate to past the center so that when a flanged opening is received by said elongated slot said flanged opening is positioned substantially at the center of said rear plate;

b) a front circular plate section having a front face and a rear face and having a through-hole at its' center for receiving a shaft capable of longitudinal movement, wherein there is also provided, at its center, a circular cavity having a diameter and depth capable of receiving the blind flange of d) for this claim;

c) an elongated shaft extending through said through-hole, said shaft having a first end and a second end which first end extends through said through-hole;

d) a blind flange having a first face and a second face, which second face is secured at its center to said first end of said elongated shaft, and wherein said front circular plate also contains a circular cavity for receiving said blind flange when retracted;

e) a C-shaped middle section, which middle section is located between and is connected to said circular rear plate section and to said front circular plate section wherein said C-shaped middle section is of a thickness that provides a space between said circular rear plate section and said front circular plate section such that it is capable of receiving the flange of the flanged opening to be sealed and for receiving said blind flange and having sufficient room for the longitudinal movement of said blind flange in and out of contact with the flange of the flanged opening to be sealed, and wherein said C-shaped middle section has substantially the same circumferential diameter as said circular rear plate section and said circular front plate section, and wherein the open section of said C-shaped middle section is of a size sufficient for receiving the flange of the flanged opening to be sealed;

f) an actuator secured to said circular front plate, which actuator, is capable of horizontally moving said shaft and blind flange so that said blind flange can be moved in and out of contact with said flange of the flanged opening to be sealed; and g) a fluid passageway extending through the longitudinal center of said elongated shaft and through the center of said blind flange which passageway is capable of allowing a fluid to be freely moved through said elongate shaft and through the center of said blind flange.

In a preferred embodiment of the present invention there is provided an annular sealing material between said blind flange and the flange of the flanged opening and wherein the diameter of said annular shaped sealing material is greater than the diameter of said opening to be sealed but smaller than the diameter of said blind flange.

In another preferred embodiment of the present invention the rear plate section, the front circular section and said middle section are separate sections secured together by a securing means.

In yet another preferred embodiment of the present invention said rear plate section, said front circular section and said middle section are manufactured as a single unitary item.

In another preferred embodiment of the present invention the single unitary item is manufactured by a process including forging, casting, extruding, or machining.

In another preferred embodiment of the present invention the shaft and blind flange is operated by an actuator.

In another preferred embodiment of the present invention the actuator is powered manually, pneumatically, hydraulically, magnetically, or electromagnetically.

In still another preferred embodiment of the present invention there is provided hydrostatic testing equipment fluidly secured to said shaft.

DETAILED DESCRIPTION OF THE PRESENT INVENTION

A substantial fraction of flanged conduits and equipment carry potentially hazardous fluids, often at elevated temperatures and pressures. Because safety is of upmost importance such flanged conduits and equipment must to tested before, as well as during, industrial use. The primary testing used for such flanged items is pressure testing, also referred to as hydrostatic testing or hydrotesting. Both terms can be used interchangeably herein. It will be understood that the terms "flanged item", "flanged opening", and flanged equipment can also be used interchangeably herein. Non-limiting examples of such flanged items that are typically required to be pressure tested include piping, pipelines, hoses, pumps, compressors, mixers, boilers, tanks, pressure vessels, heat exchangers, and the like. Such flanged items typically come under numerous regulatory and governmental safety compliance requirements as well as design and fabrication Code criteria. As such, hydrotesting of flanged piping systems, pipelines. as well as related flanged components and equipment are required to be hydrostatically tested under statutory mandates and codes such as the ASME Boiler & Pressure Vessel Code, related Piping Codes, including local and state ordinances, as well as industrial standards. Hydrostatic testing is found in industries and uses such as, but not limited to, high-pressure superheated power steam generation, utility steam generation, offshore oil and gas, petroleum exploration, chemical process, petro-chemical process, petroleum refinery, pharmaceutical, pipelines, building construction, military, petroleum liquid and gas storage tank farm facilities, ship loading and unloading docks, railcar loading and unloading facilities, etc.

Conventional hydrostatic testing typically comprises closing both ends of a flanged item to be tested with a device designed and intended to resist the applied hydrostatic test pressure at the specified pressure and test temperature, and which is compatible with the test fluid. Blind flanges are conventionally used to close both ends. For example, one end is closed using a blind flange having a means for allowing the release of a fluid, such as air, which is displaced when the test fluid, such as water, is introduced. The other end, which will also be closed using a second blind flange, but having attached thereto equipment to introduce the test fluid into the flanged item to be tested and equipment to measure pressure fluctuations, if any, during testing.

Figure 7:
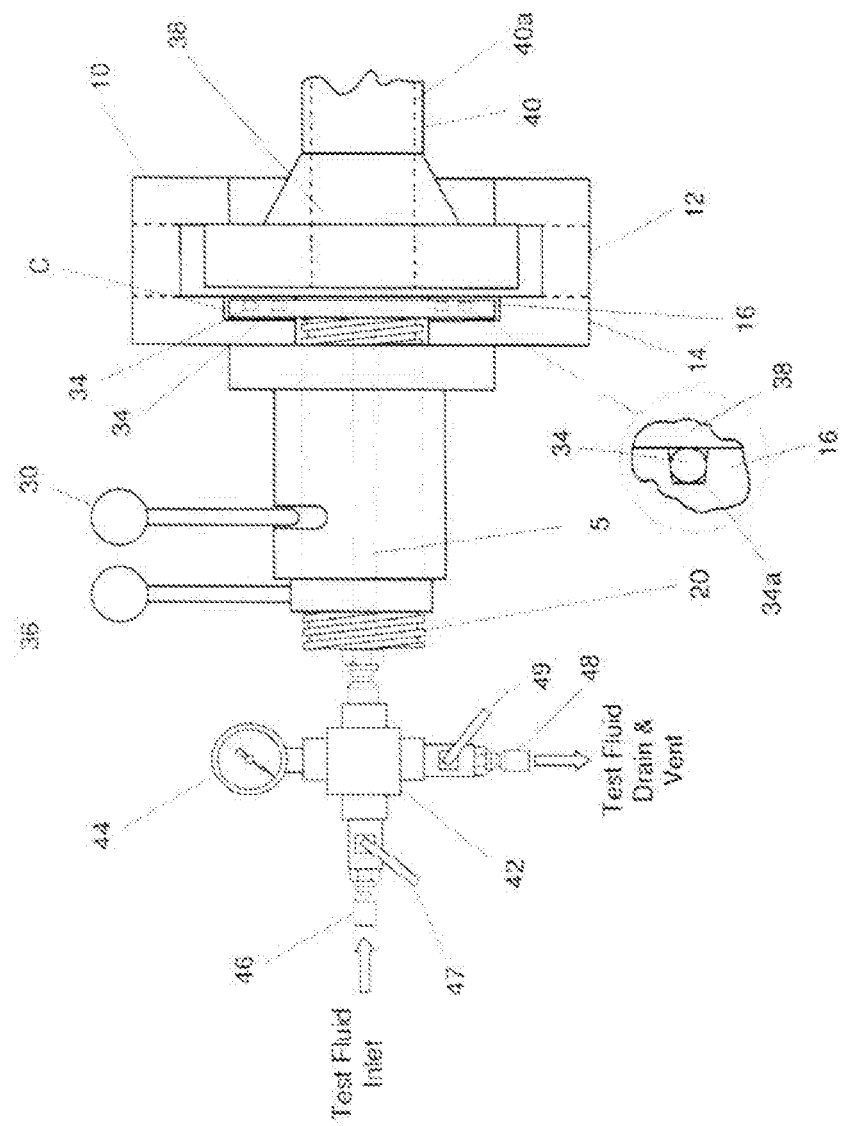
FIG. 7 hereof is a side view of a preferred apparatus of the present invention for manual operation, and showing hydrostatic testing equipment attached to the extended front end of a jackscrew and having a hollow passageway (conduit) though its length and extending through the center of the blind flange for allowing test fluid to be conducted into and out of the flanged item being tested. Also shown are two O-rings and a blown-up view the section of the blind flange showing one of the O-rings. This blown-up view shows the details of the O-ring 34 set in corresponding groove 34a. Cavity C is not shown in this figure.

At least one gasket is affixed, or inserted, between each of the blind flanges and the flanges of the item to be tested. Gaskets suitable for such use can be made from any suitable sealing material. Non-limiting examples of such suitable sealing materials include metallic materials, elastomeric materials, non-asbestos fiber-based materials, and graphite materials. Further, the gaskets can be of a variety of configurations depending on the flanged item to be tested. Non-limiting examples of such configurations include full faced, inner bolt circle, segmented, and spiral wound, all of which are well known in the art. Preferred spiral wound gaskets are typically made by winding a metal strip, usually a stainless steel, and a softer filler material such as graphite or PTFE. It is preferred to use multiple O-rings, preferably comprised of an elastomeric material. The O-ring, or any other gasket in the form of a ring, will have a diameter greater than the diameter of the opening of the flanged item to be tested. It is also preferred that the O-rings be embedded within matching grooves annularly positioned on the sealing face of the blind flange, as illustrated in FIG. 7 hereof.

The apparatus of the present invention secured to the testing end of the item to be tested will include a means by which a test fluid, preferably water, can be introduced into the flanged item. The introduction of water will displace air within the item which can be released into the atmosphere at either end of the item to be tested. For example, it is preferred that the non-test end of the flanged item also have an apparatus of the present invention secured thereto so that displaced air can be released through an outlet means attached to the apparatus. At that point, water will be turned off and air will be introduced to bring the pressure up to the desired test pressure and hold it there for the duration of the test. The desired test pressure according to code, or a prescribed test pressure, which will typically be about 130-150% of the designed working pressure. Pressurization can be applied by any suitable means, but it is generally accomplished by use of a piston pump designed specifically for hydrostatic testing. The piston pump can be powered by any suitable means, such manually or by pneumatic, electrical, or hydraulic means. It will be noted that hydrotesting can also be accomplished using a broad array of industrial gases, preferably an inert gas, more preferably nitrogen. Water is the most preferred testing fluid. The flanged item being tested must not exhibit any observed leakage or pressure declination, except for incidental changes due to atmospheric temperature change or solar radiation exposure. After completion of the prescribed applied pressure and holding time, pressure is released and the equipment drained.

Preparation for conventional hydrostatic testing is extremely laborious and costly, both in human resources and time needed to accomplish just the pre-testing procedure. For example, depending on the nominal size of a pipe, the system rated design pressure, and the test temperature, flanged connections can vary significantly in size, weight, and the number of stud bolts or traditional bolts, or bolt and nuts, required to complete the connection. The number of bolts and nuts can vary between about 4 bolts and 8 nuts to about 60 bolts and 120 nuts, or more. Blind flanges can weigh between about 2 pounds to over 16,000 pounds depending on the nominal size and pressure rating. As such, for the blind flange to both energize the gasket and adequately resist hydrostatic end force, the flange bolting must be tightened in a methodical multi-step method. For example, ASME Code (ASME PCC-1-2013) requires that the bolting be torqued (tightened) using a six step, complex cross-pattern tightening sequence methodology as follows:

| Torque increments for cross-pattern tightening | |
|---|---|
| Install | Hand-tighten then "snug-up" to 20 lb-ft (not to exceed 20% of target torque value). Check flange gap around circumference for uniformity. If the gap around the circumference is not reasonably uniform, make the appropriate adjustments by selective tightening before proceeding. |
| Round 1 | Tighten to 20% to 30% of the target torque value. Check flange gap around circumference for uniformity. If the gap around the circumference is not reasonably uniform, make the appropriate adjustments by selective tightening/loosening before proceeding. |
| Round 2 | Tighten to 50% to 70% of the target torque value. Check flange gap around circumference for uniformity. If the gap around the circumference is not reasonably uniform, make the appropriate adjustments by selective tightening/loosening before proceeding. |
| Round 3 | Tighten to 100% of the target torque value. Check flange gap around circumference for uniformity. If the gap around the circumference is not reasonably uniform, make the appropriate adjustments by selective tightening/loosening before proceeding. |
| Round 4 | Continue tightening the bolts, but on a circular, clockwise pattern until no further nut rotation occurs at the round 3 torque target value. |
| Round 5 | Time permitting, wait a minimum of four (4) hours and repeat Round 4; this will restore the short-term creep relaxation/nut embedment losses. |

Given the complexity of bolt installation and tightening requirements, as well as rigging, handling, and lifting very heavy components, the conventional procedure is expensive, extremely laborious, time-consuming, and dangerous. As previously mentioned, conventional hydrostatic testing procedure can take from a couple of hours to one or more days before the hydrostatic test can be initiated by filling the item to be tested with the test fluid and the results observed and measured.

The apparatus of the present invention eliminates the need for installing and torqueing a plurality of bolts. Additionally, bolting stretches when tightened to energize a gasket to resist hydrostatic test pressure. Therefore, bolting used for conventional hydrostatic testing has a relatively short lifecycle. Furthermore, bolting used for hydrostatic testing must also meet various Code metallurgical and procurement standards, making it relatively expensive to stock and maintain.

There are myriad sizes and lengths required to be inventoried for carrying out testing. Further, the significant reduction in time needed to perform hydrostatic testing with use of the instant apparatus proportionally reduces safety risk exposure, costs, and enables considerable enhancement of productivity. This allows substantially more pipes, hoses, and/or equipment to be tested in any given amount of time. The apparatus of the present invention is a quick-acting device that can be installed in minutes as opposed to hours or days, and can be sealingly energized in seconds against the flange of the flanged item to be tested.

The instant apparatus can be fabricated from any suitable material that can withstand the hydrostatic testing pressures and temperatures, with an appropriate margin of safety. Non-limiting examples of such suitable materials include conventional carbon steel, stainless steel, alloy steel, corrosion resistant steel alloys, aluminum alloys, copper-nickel alloys, and titanium. Also suitable are engineered light-weight aerospace aluminum alloys and forgings, in addition to machined plate, and/or round or flat bar stock typically possessing mechanical properties that significantly exceed that of most common carbon steel alloys.

Preferred materials are the 7xxx series alloys containing the addition of zinc in the range of about 0.8 to about 12 weight %. In particular, 7075 and 7178 containing chromium, copper iron, magnesium, and manganese additions, including zirconium and titanium for forged components and has a tensile strength of up to and including 88 ksi with a corresponding yield strength of 78 ksi. Other preferred aluminum alloys include, but are not limited to the 6xxx series alloys having a tensile strength up to and including 58 ksi and a corresponding yield strength of 52 ksi, containing magnesium and silicon additions of about 1.0 weight % and are more easily extrudable than other aluminum alloys. Other preferred aluminum materials are the 5xxx series alloys having a tensile strength up to and including 54 ksi and a corresponding yield strength of 41 ksi, containing the addition of magnesium in the range of about 0.8 to 5.1 weight %. The 2xxx series alloys include from at least about 0.5 wt. % Copper (Cu) to about 8 wt. % Cu and having an ultimate tensile strength of up to 72 ksi with a corresponding yield strength of 67 ksi. All the above weight percents are based on the total weight of the alloy.

Another class of suitable materials are the chromium-molybdenum heat-treated alloys steels such as 4130, 4140, 4142, 4340, etc. with tensile strengths averaging 100-150 ksi and corresponding yield strengths averaging of 90 ksi. Also suitable are metallic materials that include copper-nickel alloys, and in particular 70-30. Other preferred materials include high-performance nickel alloys such as alloy 600, 625, and 800 with tensile strengths of 85-145 ksi and corresponding yield strengths of 80-110 ksi.

It is also within the scope of this invention that lightweight, high-strength, fiber-reinforced composite materials that are typically comprised of a polymer or ceramic matrix that can be a polymeric material, or a ceramic can be used. The fibers of such materials are generally carbon, metallic, ceramic, carbon nanofibers, or a combination thereof, that can be oriented in a desired orientation in the matrix to add strength and to prevent de-lamination. Essentially, the present invention can be fabricated from any suitable metallic or non-metallic material capable of meeting the required strength needed to resist the hydrostatic test pressure with a suitable safety margin. It is preferred that the apparatus of the present invention be light enough to be manually lifted (far less weight than a conventional carbon or stainless-steel blind flange) for the more commonly tested nominal pipe sizes. Obviously, larger diameter and higher pressure rated flange system can require more than one person to deploy, or can require the use of a hoisting device and lifting eyes. Irrespectively, use of the apparatus of the present invention significantly reduces test time, resources, and cost, while enhancing safety exposure to personnel when compared to conventional methods.

The present invention is designed and intended to be deployed over an extremely broad range of flange designs, configurations, and materials, including but not limited to flat face, raised face, and/or ring joint, screwed, slip-on, socket weld, weld neck, and long weld neck. The present invention can also be used with intermediate barrel, heavy barrel, equal barrel, lap joint, and orifice flanges for every pressure Class as dimensionally specified in ASME B16.1, B16.5, B16.24, B16.36, B16.42, or B16.47, and other industry standards such as applicable Manufacturers Standardization Society (MSS) and ASTM specifications. The present invention is intended to also be deployed on a broad array of military, proprietary, and hydraulic power flanges. Essentially, the present invention can be used on any flanged fluidic or pneumatic connection germane to any industry, and which can be fabricated from any suitable metallic or non-metallic material.

Figure 1:
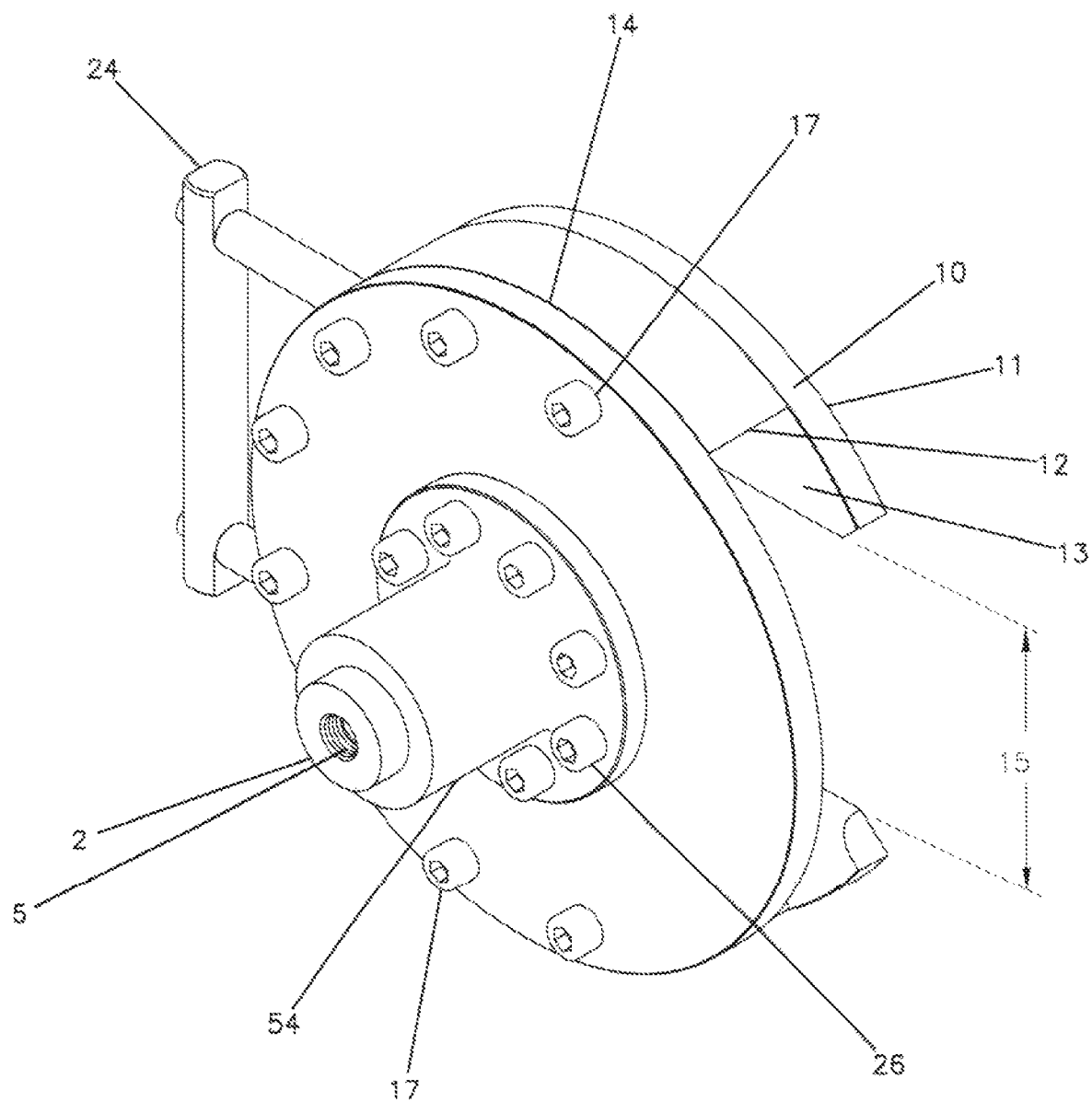
FIG. 1 hereof is an elevated perspective view of the front of a preferred embodiment of the apparatus of the present invention showing a generic actuator means (54) for advancing and retracting a blind flange, (also sometimes referred as a blind plate), in and out of sealing contact against the face of the flange of the flanged item to be tested.
Figure 8:
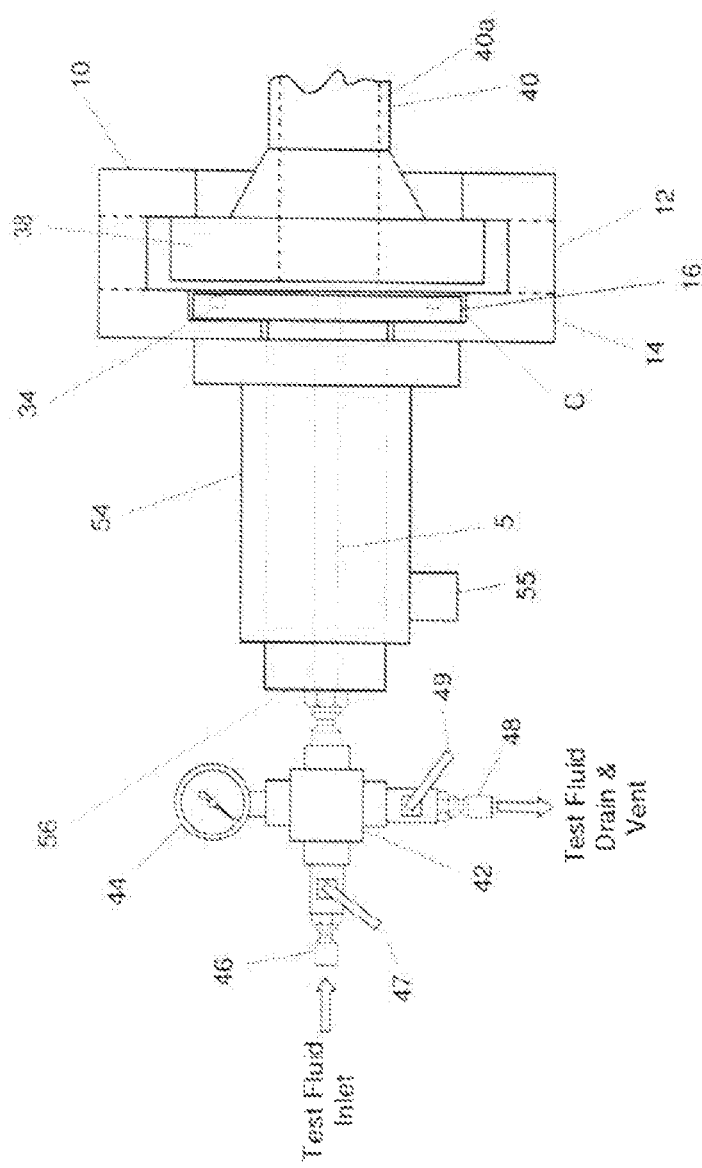
FIG. 8 hereof is a side view of a preferred apparatus similar to that shown in FIG. 7 hereof, but wherein the blind flange is operated by a means other than manually, which means can include a hydraulic means, a pneumatic means, an electromechanical means, or a magnetic means. Cavity C is not shown in this figure.
Figure 9:
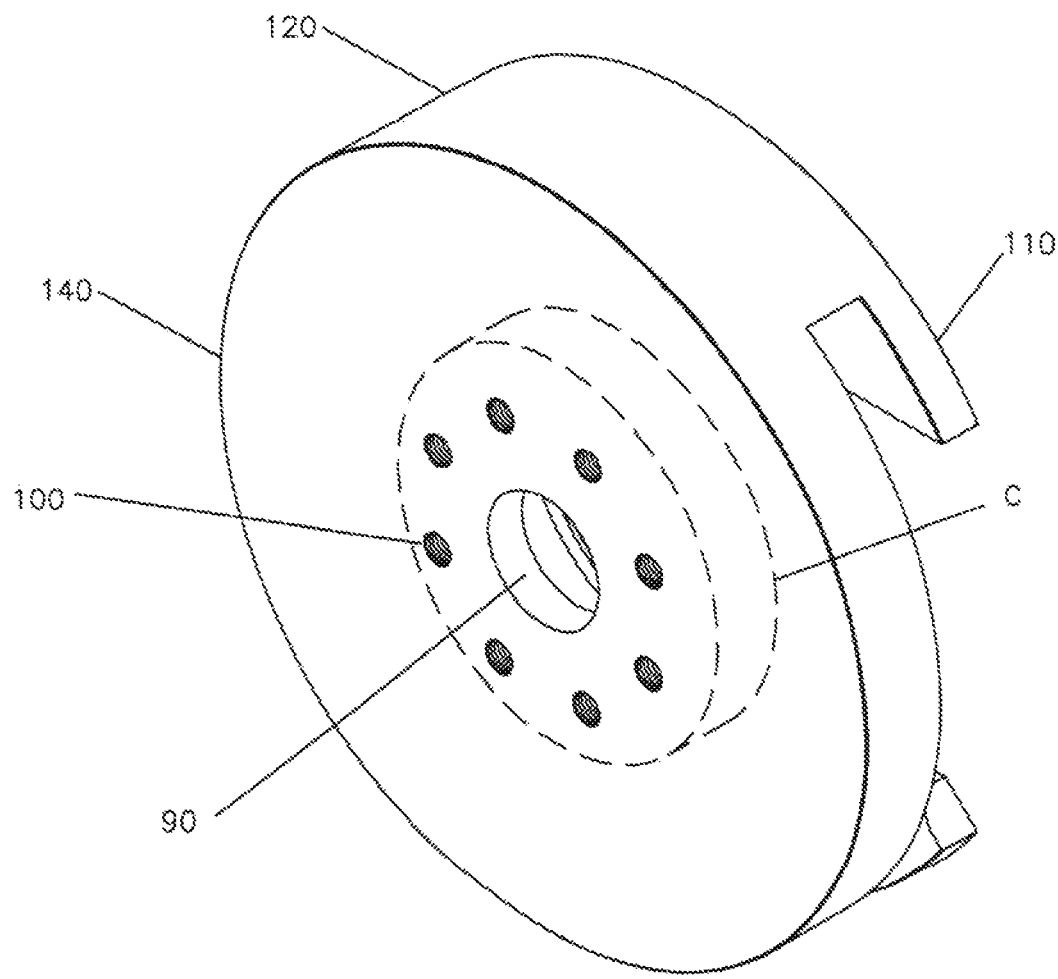
FIG. 9 hereof is an elevated perspective view of the front of a preferred embodiment of the present invention, similar to that illustrated in FIG. 2 herein, but wherein the front section, the spacer section, and the rear sections are not individual component parts secured together, but are sections, or areas, of a single unitary piece that is manufactured by a method such as forging, casting, extruding, or machining. Cavity C is shown recessed into the back surface. Cavity C can be recessed into the back surface by any suitable method depending on how this embodiment is manufactured. Non-limiting examples of such methods include machining, molding, and forging.
Figure 10:
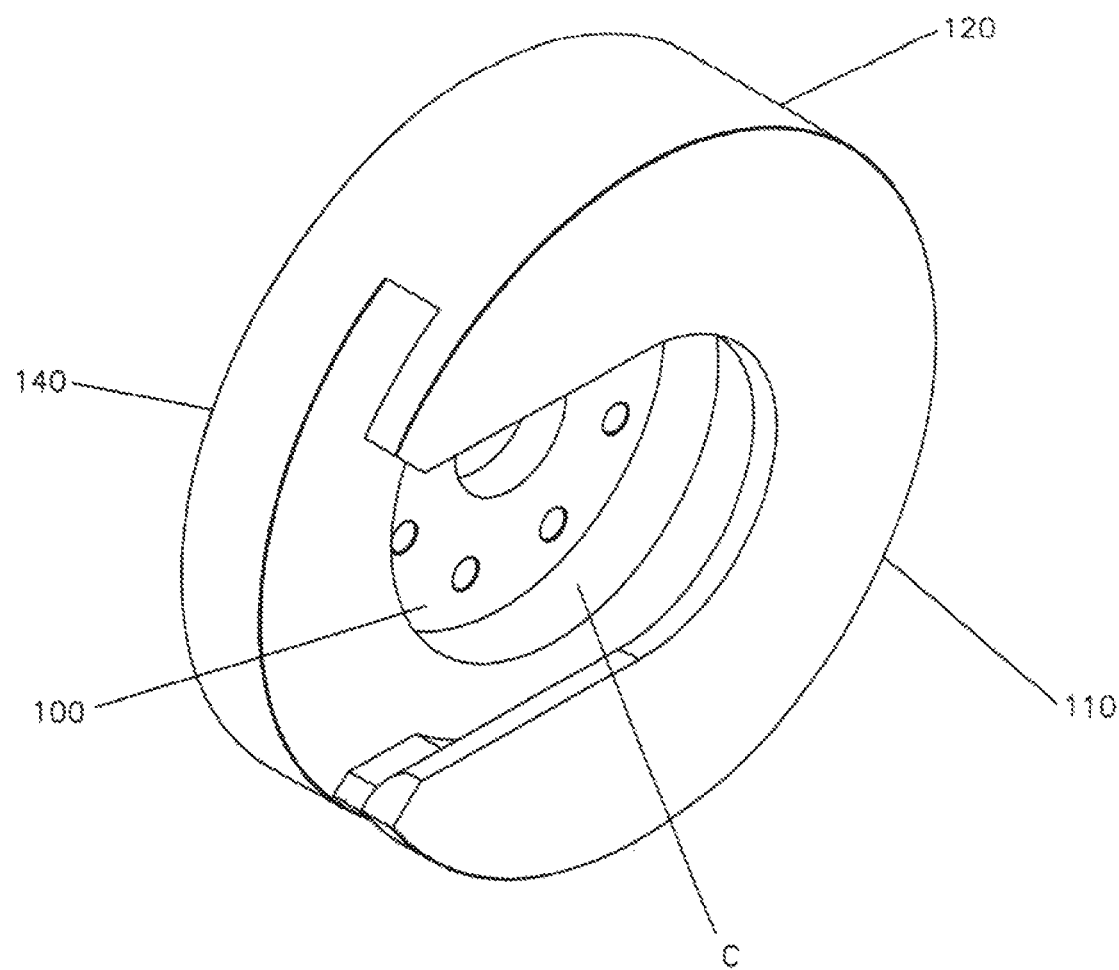
FIG. 10 hereof is an elevated perspective view of the rear face of a preferred embodiment of the apparatus of the present invention illustrated in FIG. 9 hereof and similar to the illustration of FIG. 1 hereof, but wherein the front section, the spacer section, and the rear sections are not individual component parts secured together, but are sections, or areas, of a single unitary piece that is manufactured by a method such as forging, casting, extruding, or machining.
Figure 11:
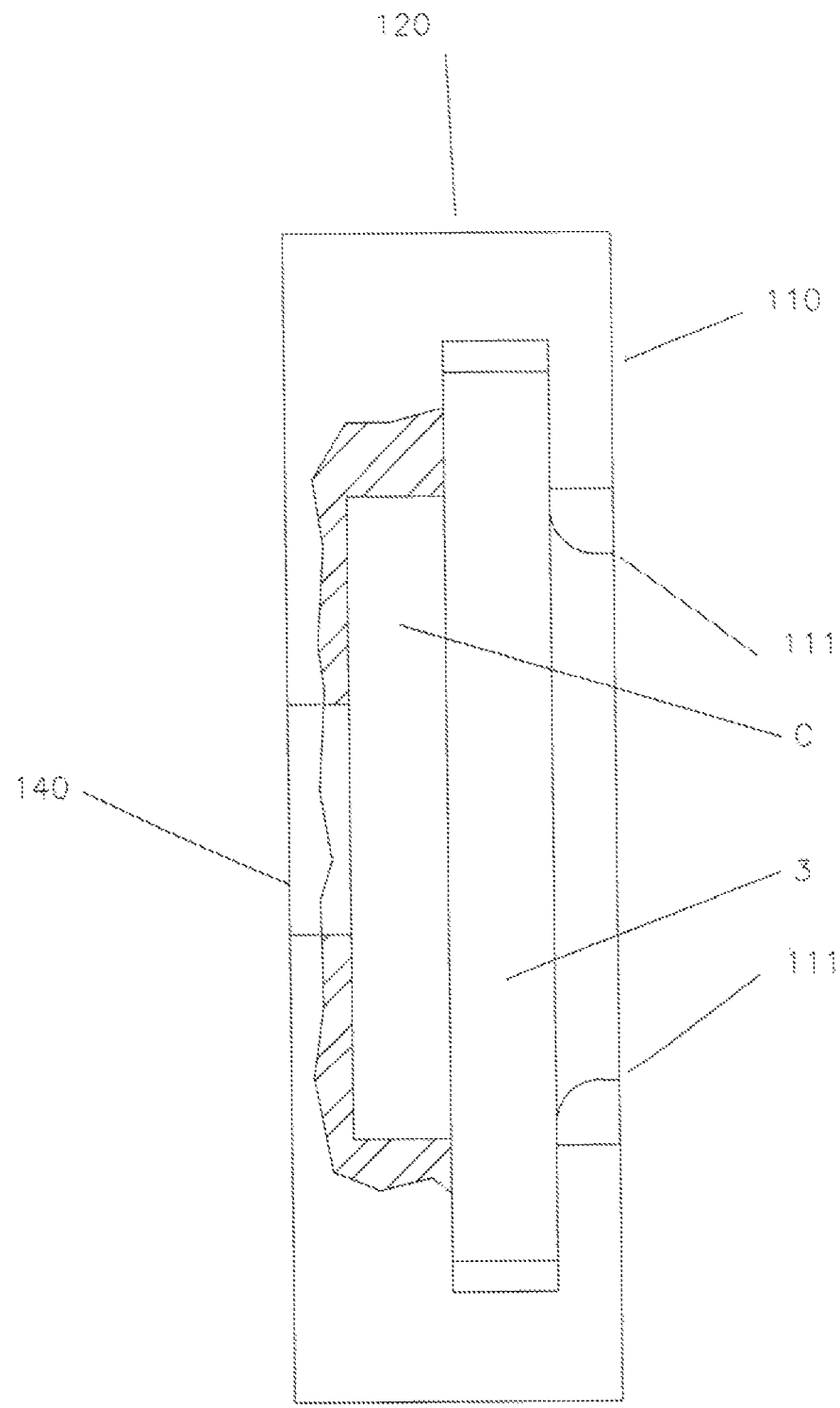
FIG. 11 hereof is a side view of the apparatus of FIGS. 9 and 10 hereof.

The present invention will be better understood with reference to the figures hereof. FIG. 1 hereof is an elevated perspective front view of a preferred embodiment of the apparatus of the present invention which is comprised of a slotted rear plate-like section 10 having a rearward facing flat surface 11 and front facing flat surface 13. The width of elongated and U-shaped slot 15 of slotted plate-like section 10 is sized sufficiently such that it can make contact with the outside periphery and back side of the flange of a flanged item to be tested. It is preferred that the flanged item to be tested is a flanged pipe or pipe section, such as that illustrated in more detail in FIG. 5 hereof. The size of elongated U-shaped slot 15 is not specific to the outside diameter of the pipe to which the flange is attached, but is more specific to the diameter of the area where the flange is secured, preferably by welding, to the pipe. This will allow the apparatus of the present invention to be positioned (slipped) over and securely clamped to the flange of the flanged item to be tested. There is also provided a front plate section 14, which is preferably circular, having at its center an annular opening (not shown,), which can also be referred to as a through-hole. The diameter of the through-hole will be of an effective size to allow unrestricted passage of axial actuator shaft, also sometimes referred to herein as an elongated shaft which can be a piston rod 2, and which in another embodiment of the present invention is a jackscrew 20 (FIG. 3 hereof). Said elongated shaft has a first end and a second end which first end extends through said through-hole. There is also provided a blind flange having a first face comprising at least one sealing means, preferably one or more O-rings, and a second face, which second face is secured to said first end of said elongated shaft. Said elongated shaft is capable of moving said blind flange longitudinally (back and forth) between slotted plate-like section 10 and front plate section 14. The actuator shaft will include a conduit, or passageway open from one end of the shaft to the other end of the shaft to allow for a test fluid to be conducted there-thru into the flanged item to be tested. A slotted spacer, or C-shaped middle section 12, is located between slotted rear plate-like section 10 and front plate section 14. Slotted C-shaped middle section 12 is of sufficient width w that defines space 3 (FIG. 4 hereof) between these two plate sections. Width w is of a sufficient dimension so that blind flange 16 (FIG. 1 hereof) and flange 38 (FIG. 5 hereof) of a flanged pipe to be tested can fit within space 3 with enough room so that blind flange 16 can be engaged and disengaged against the flange of the flanged item to be tested. It will be understood that one or more of slotted rear plate-like section 10, slotted C-shaped middle section 12, and circular front plate section 14 can be separate individual pieces secured to one or more neighboring piece(s) by any securing means, preferably bolts. FIG. 1 to 8 hereof show the embodiment of the present invention wherein all three sections are individual sections secured together. FIGS. 9, 10, and 11 hereof show another preferred embodiment of the present invention wherein all three sections are sections, or areas, of a single one-piece unit manufactured by any suitable process, such as forging, casting, extruding, or machining.

Blind flanges are well known in the art and are typically comprised of a solid disk that can be pressed against a flanged opening to block and seal the opening. A suitable gasket material is typically positioned between the blind flange and the flange of the flanged item to be tested to form an adequate pressure seal. It will be noted that the apparatus of the present invention can be used at both ends of the flanged item to be tested. For example, lengths of piping having a flange at both ends can have an apparatus of the present at each flanged end. It is preferred that one end of the flanged piping have secured thereto an apparatus of the present invention that contains hydrostatic testing equipment, such as a pressure gauge and suitable valving to allow for the introduction and release of air and testing fluids. The opposite end will preferably have secured thereto another apparatus of the present invention. This apparatus at the other end will also contain an actuator and actuator shaft was previously described herein, but it will preferably also contain a valve to release air from the flanged item to be tested when a testing fluid in introduced. Of course, the testing fluid used to pressurize the flanged item to be tested can be released from either or both ends.

Blind flange 16 can contain at least one gasket, preferably at least one 0-ring, preferably embedded into a corresponding annular groove(s) machined, pressed, cast, or forged into the mating surface of the blind flange. This is the surface that will be sealingly pressed against the surface of the flange of the flanged item to be tested to create an adequate seal against test pressures. While a conventional blind flange will typically include mounting holes around its perimeter to enable it to be secured to the flange of the flanged item to be tested, blind flange 16 of the present invention will not have such holes. It will instead be activated against the flange of the flanged item to be tested by advancing the actuator shaft 2 or 20 so that a gasket, which will preferably be one or more O-rings (34 of FIG. 2 hereof) can be energized against the surface of the flange of item to be tested.

FIG. 1 hereof also shows an axial non-obstructed passageway 5 through actuator shaft 2, or jackscrew 20, as applicable and through the center of blind flange 16. Passageway 5 is used to conduct testing media, which in most cases will be water and air, into and out of the flanged item to be tested. It is preferred that the interior of the front or outer end of this passageway be threaded to allow for the attachment of hydrostatic testing equipment, such as valves, manifolds, quick connect fittings, pressure gauges, etc. Non-limiting examples of preferred testing equipment include a pressure gauge, a fill valve, and a vent valve, as shown in FIGS. 7 and 8 hereof. FIGS. 7 and 8 also show a pipe nipple, or quick-connect coupling device, both of which are well known and accepted in the art.

An actuator means is provided for supporting and actuating actuator shaft 2 in both longitudinal directions to engage and disengage blind flange 16 against the flange of the item to be tested. Unlimited examples of such actuator means include manual, hydraulic, pneumatic, electrical, and/or a magnetic actuator cylinder 54 or housing, or flanged mechanical jackscrew nut 18 (FIG. 3 hereof) secured to circular plate 14 by use of any suitable securing device, preferably bolts 26. It will be understood that jack screw nut, or hub, 18 can be integrally manufactured with circular plate 14 into a single unit, or attached by means of a press fit or screw threads. FIGS. 5, 6, 7, 8A, 8B and 9 hereof show activating rod 2 as a jack screw which can be manually turned by use of lever 30 to position blind flange 16 against a flange of the flanged item being tested and locked into place by means of lever 36. It will be noted that although O-rings are not shown in some of the figures hereof a sealing means of any suitable type will need to be provided before any flanged item to be tested is pressurized for testing.

Jack screws are well known in the art and are generally defined as screws that can be turned to adjust the position of an object into which it fits. Such a means will be able to move blind flange 16 against the sealing face of the flange of the flanged item being tested and to release it from the face of said flange to allow the apparatus of the present invention to be removed.

As previously mentioned, slotted rear plate-like section 10, slotted spacer 12, and front plate section 1 can be individual sections that can be secured to each other by any suitable means. Non-limiting suitable means for securing any combination of these parts together include bolts 17, or nuts and bolts, welds, adhesives, and or interference press fits. Preferred is the use of bolts of sufficient length to be screwed through all three sections through matching bolt holes or having matching threaded bolt holes located around the periphery of each part. It is within the scope of this invention that these individual parts can be fabricated as a single unit comprised of all three sections by any suitable means, such as forging, casting, extrusion, or machining, or any other suitable technology. There can also be provided an optional handle 24 of any suitable design to aid in positioning and removing the apparatus of the present invention to and from the flanged item to be tested. There can also be provided one or more lifting eyebolts (not shown) or lifting pad eyes (not shown) attached thereto by means of screw threads, welded, press fit, or through the use of adhesives, and/or integrally forged, cast, or extruded to enable the apparatus of the present invention to be positioned with use of powered lifting equipment.

Figure 2:
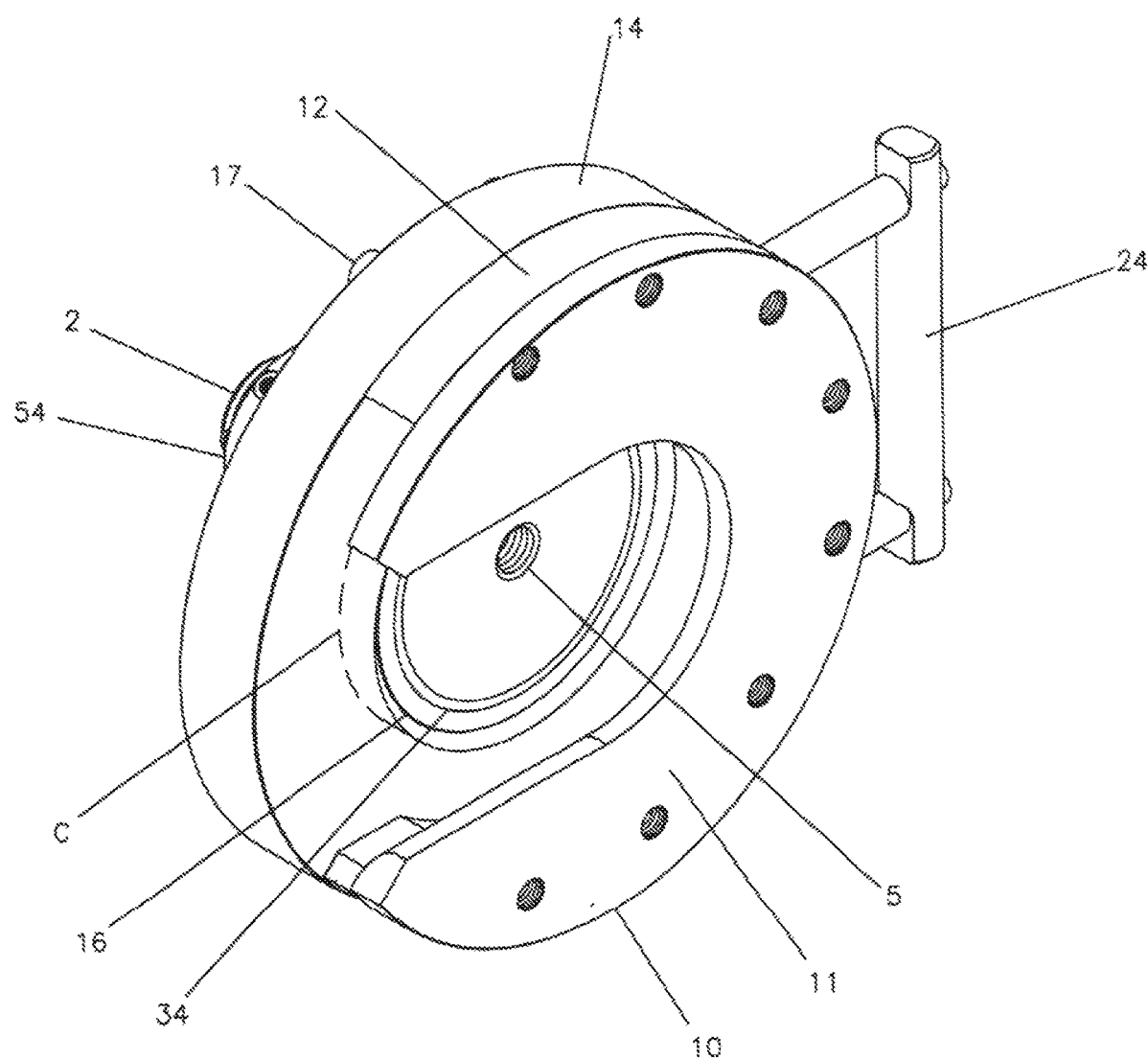
FIG. 2 hereof is an elevated perspective view of the rear face of the preferred embodiment of the apparatus illustrated in FIG. 1 hereof showing a blind flange (16) having an O-ring (34) partially embedded in a corresponding annular groove, which O-ring is capable of establishing a substantially leak-proof pressure-seal when pressed against the flange of a flanged item to be tested. Also illustrated in FIG. 2, indicated by dashed lines, is cavity C, which is circular, and which is set into the rear face of the front section for receiving a protecting the blind flange to protect it during the resting procedure.
Figure 3:
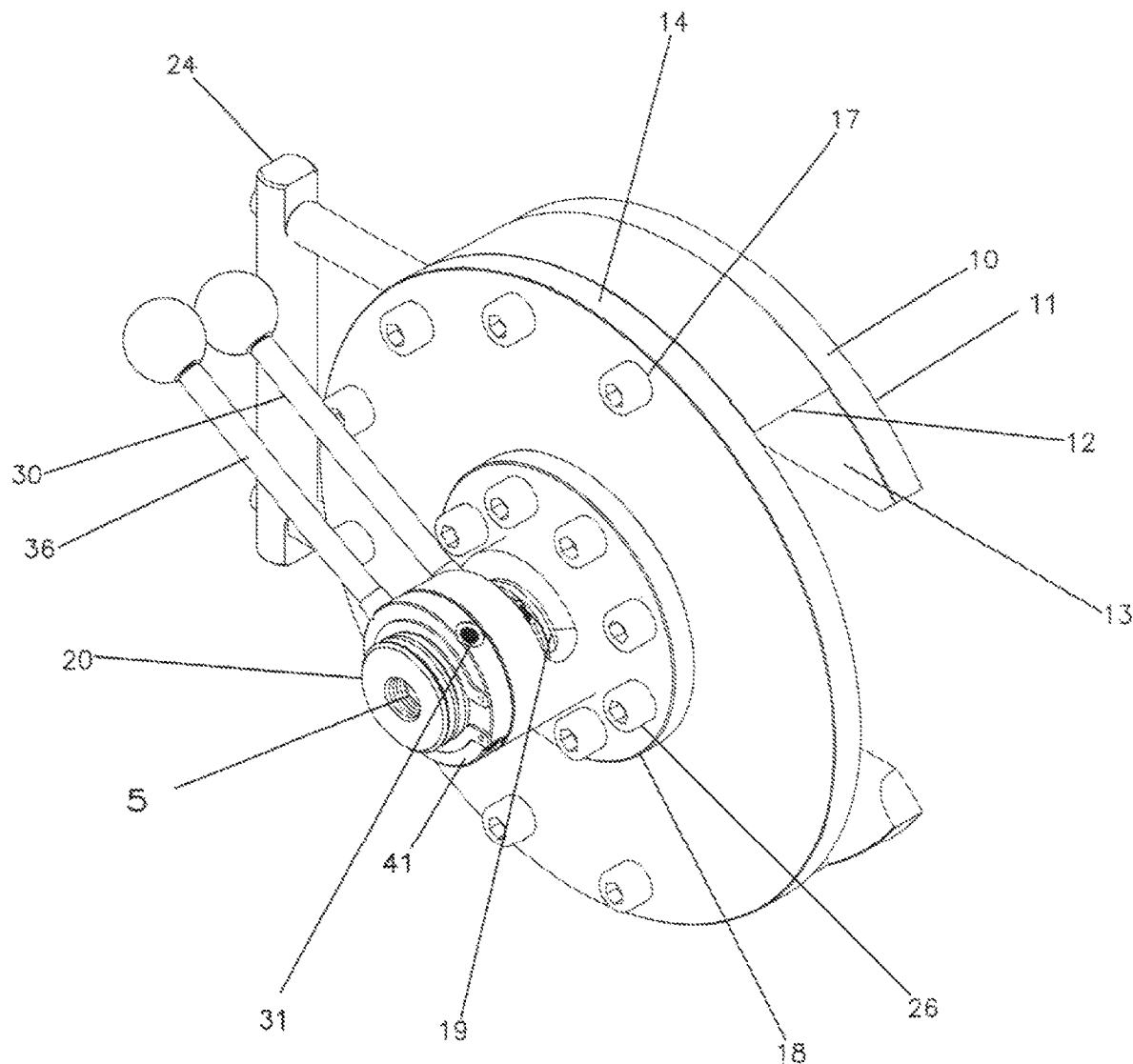
FIG. 3 hereof is an elevated perspective front view of a preferred apparatus of the present invention, but showing a jackscrew assembly as a manual actuator means for advancing and retracting the blind flange into and out of a sealing contact against the flange of an item to be tested.

FIG. 2 hereof is an elevated perspective back view of a preferred embodiment of FIG. 1 hereof, but also showing one preferred sealing means as an O-ring 34 comprised of a suitable sealing material, preferably an elastomeric or plastic material embedded in a corresponding O-ring groove around the face of blind flange 16 so that a desired portion of O-ring 34 extends an effective distance above the face of the blind flange to enable it to be compressed against the surface of the flange of the flanged item to be tested to provide a leak-proof seal. It will be understood that more than one O-ring, or other type of gasket, can be used so that there will be multiple sealing surfaces for uses with high pressure testing. For example, a flat gasket of suitable sealing material can be used between blind flange 16 and flange 38 (FIG. 5), of the flanged item to be tested. While an elastomeric material is preferred, the gasket or O-ring, can be fabricated from a material such as vegetable fiber, plastic, etc. as previously discussed herein. Any sealing arrangement of the present invention can also fit into a packet of some other suitable form that is integral with or machined into blind flange 16. This figure also illustrates cavity C which is provided to protect any O-rings from damage during use. Blind flange 16 is retracted in cavity C during positioning of the flange of the flanged item to be tested. Once in place, the blind flange will be extended from cavity C and set against the flange of the flanged to be tested.

FIG. 3 hereof is an illustration of the preferred embodiment of FIGS. 1 and 2 but showing a manual means for actuating blind flange 16. This manual means includes a jack screw 20 and jack screw nut 18 which is secured to circular plate 14 by a plurality of bolts 26. As previously mentioned, blind flange 16 is actuated and locked into place by use of two levers 30 and 36. Lever 30, is preferably secured directly to jack screw 20, and is used to advance the blind flange 16 so that it sealingly presses against the face of flange 38, and in doing so compresses one or more O-ring seals or other gasket or sealing material and energizing it such as to provide an adequate seal while being constrained in the O-ring groove or seal pocket. All such sealing mechanisms and devices are well known in the art. Lever 36, which is secured to lock-ring 41, which itself is secured to jack screw 20 by locking screws 31, is used to lock jack screw 20 into place to prevent inadvertent movement of blind flange 16 away from the flange of the flanged item being tested. Such a feature is considered desirable for safety reasons, particularly while testing at high pressures and/or while using a gaseous test media. As such, the locking step is more of an added safety feature to prevent back-slipping, but this embodiment of the apparatus of the present invention can be successfully operated with use of only lever 30. It is preferred that both levers be used. It will be noted that jack screw nut 18 contains a cutout 19 of suitable dimensions to allow levers 30 and 36 to travel clockwise and counter-clockwise during engagement and disengagement of blind flange 16.

Figure 4:
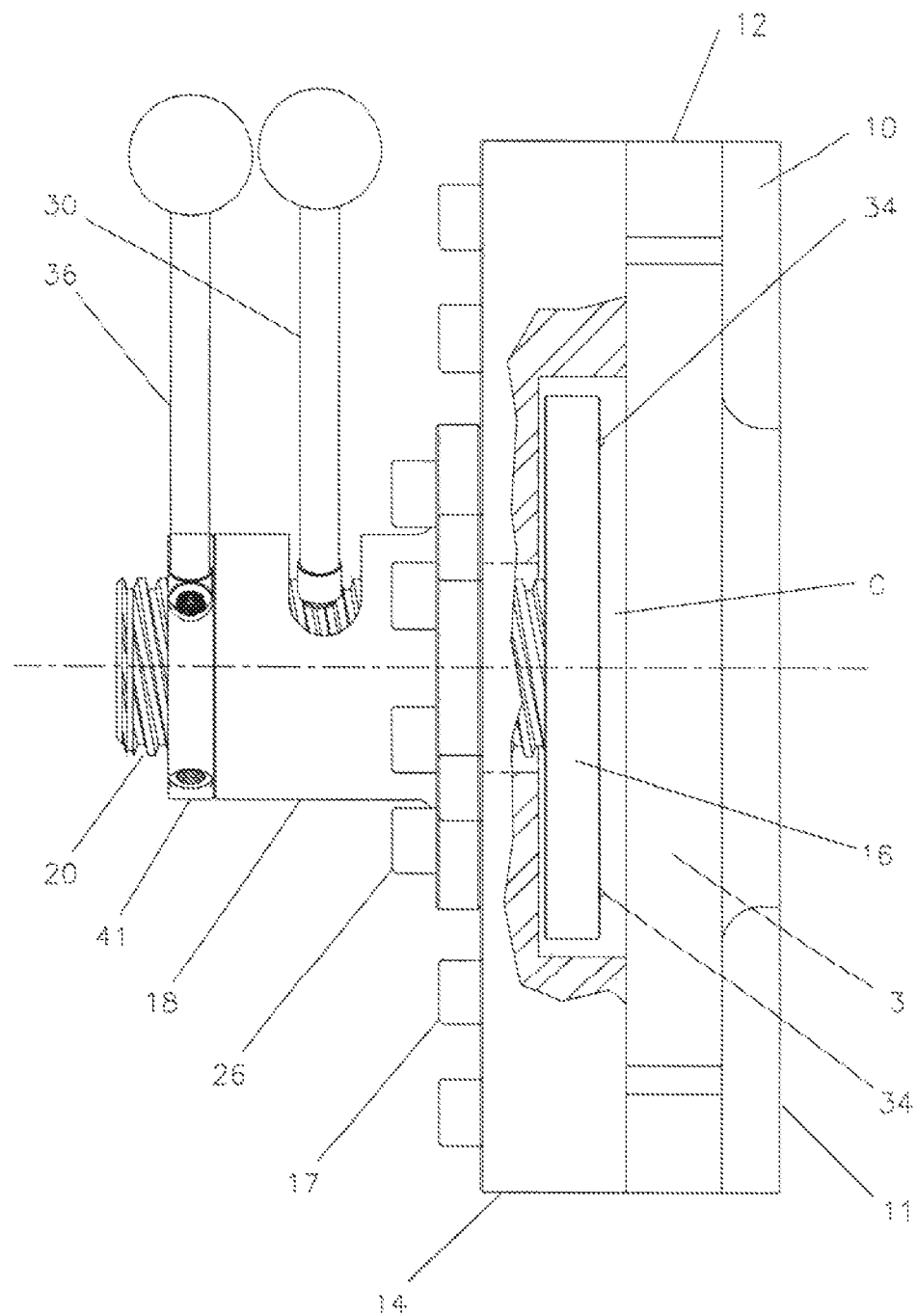
FIG. 4 hereof is a side view of the preferred embodiment illustrated in FIG. 3 hereof showing the blind flange 16 retracted into cavity C when the blind flange is not engaged against a flanged opening of a flanged item to be tested.

FIG. 4 hereof is a side view of the embodiment of FIG. 3 hereof and shows cavity 3 defined by the thickness w of slotted spacer section 12. This FIG. 4, as well as FIG. 5 hereof also shows a lock ring 41 which is secured to lever 36. This figure shows blind flange 16 retracted into cavity C for protection.

Figure 5:
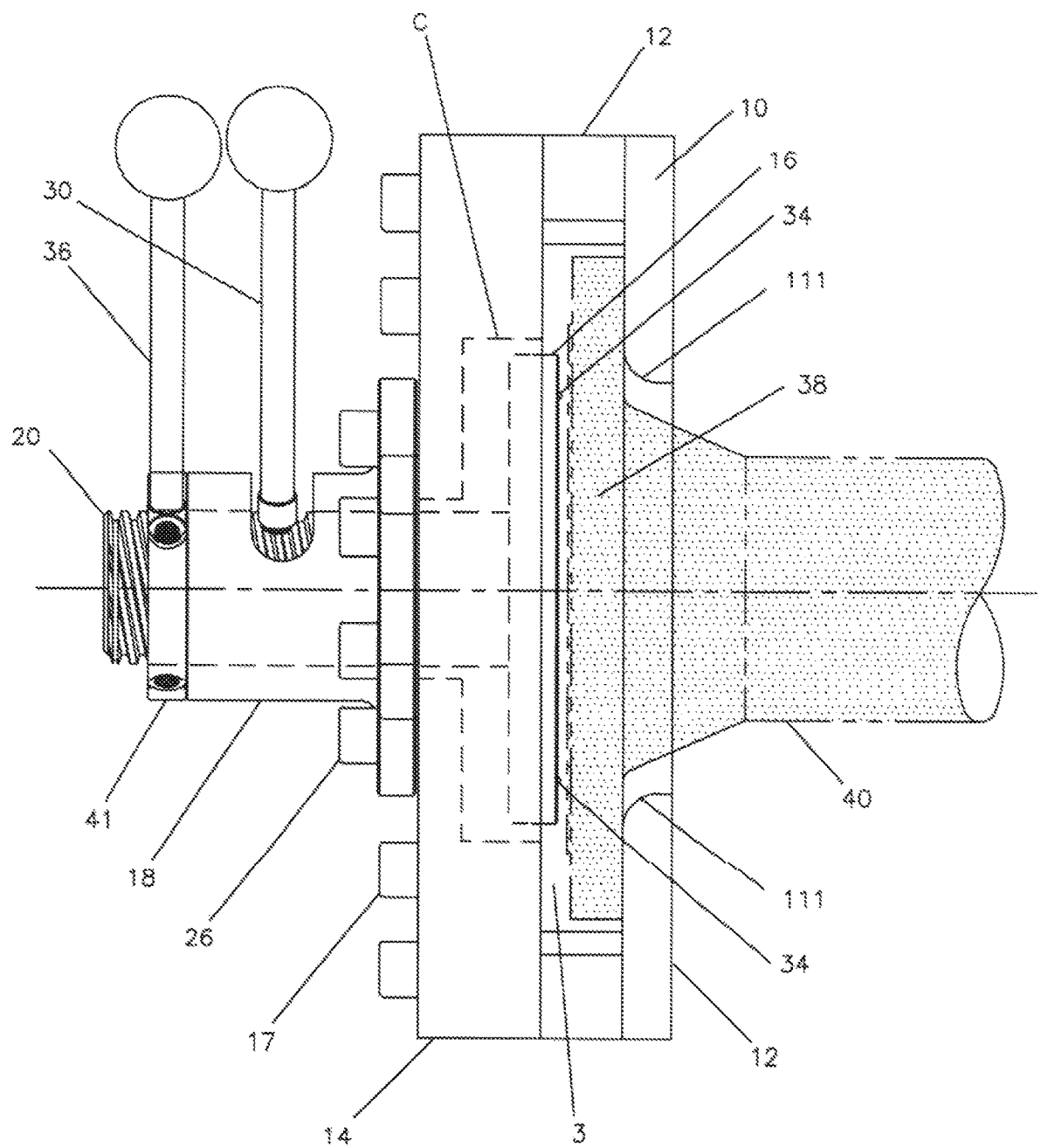
FIG. 5 hereof is the same side view as illustrated in FIG. 4 hereof, but showing a blind flange 16 engaged and secured, against the flange 38 of a flanged pipe to be tested, thus forming a liquid-tight seal. Blind flange 16 is shown extended out of cavity C.

FIG. 5 hereof is the side view illustration of FIG. 4 hereof, but showing flange 38 affixed to the pipe, hose, or equipment 40 to be tested. FIG. 5 hereof shows blind flange in sealing contact with flange 38 sufficiently to energize an O-ring or gasket seal (not shown) against the sealing face of flange 38. It will be noted that it is preferred that portion of slotted rear section 10 that defines the slot has a curved edge 111 that will effectively correspond to the curves area where the flange is welded onto the flanged item, which will preferably be a flanged pipe. This figure shows blind flange 16 extended out of cavity C and against the face of the flange 38 of the flanged item to be tested.

Figure 6A:
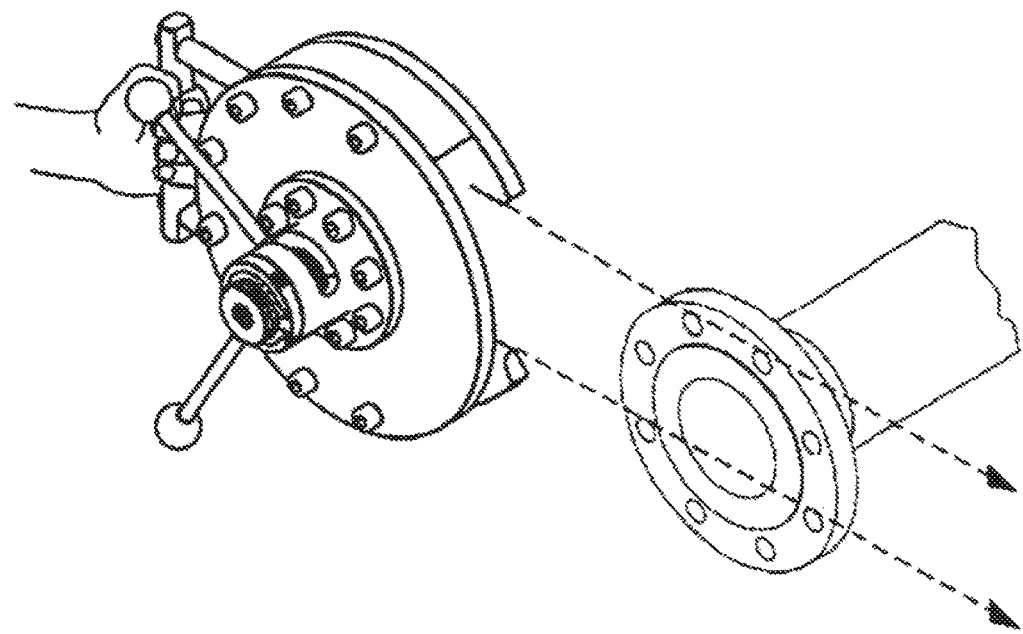
FIG. 6A hereof is an elevated perspective view of the apparatus illustrated in FIG. 3 hereof being slipped over the flange of a flanged pipe to be hydrotested. The two dashed lines ending with arrows indicates movement of the apparatus of the present invention being maneuvered into place over a flange.
Figure 6B:
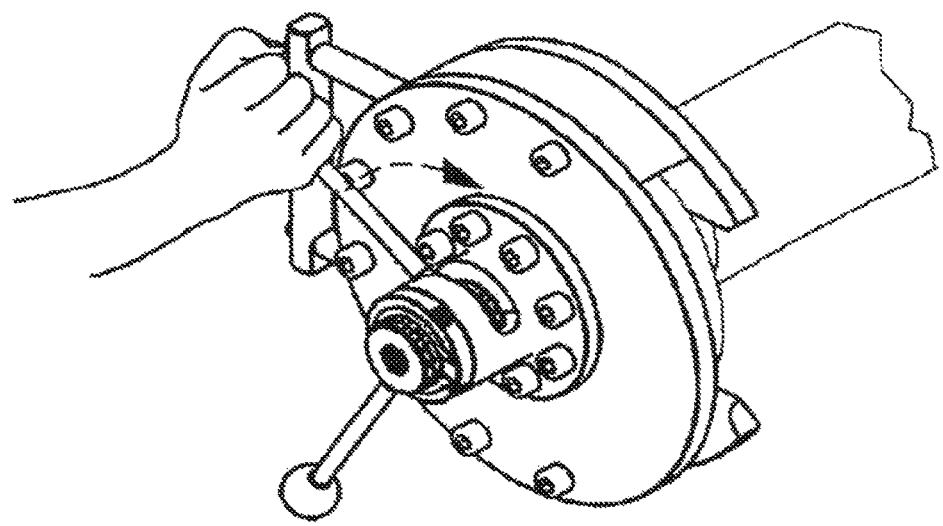
FIG. 6B hereof is an elevated perspective view of the apparatus illustrated in FIG. 3 hereof, that has already been slipped into place onto the flange of a flanged item to be tested. This Figure also shows the blind flange being manually activated by use of a lever that is rotated to advance a jack screw thus engaging a blind flange against the flange of the flanged item to be tested.

FIGS. 6A and 6B are simplified illustrations showing how a preferred embodiment of the present invention represented in FIGS. 3, 4 and 5 hereof can be easily slipped into place over the flange of a flanged item to be tested and secured in place. Individual parts of the apparatus are not labeled in these two Figures because all have already been identified in at least two previous figures hereof. FIG. 7 hereof is a more detailed view of the embodiment illustrated in FIG. 5 hereof, but showing the internal passageway 5 through jack screw 20 and through the center of blind flange 16, which passageway serves to deliver fluid into the flanged item to be tested. FIG. 7 also shows a test manifold 42 and conventional equipment used for hydrostatic testing which includes pressure gauge 44, inlet valve 46 and inlet control handle 47, for controlling the flow of fluid into the item to be tested and outlet valve 48 and outlet control handle 49 for removing test fluid from the flanged item that was tested. It will be noted that in all figures jack screw 20, which is just one embodiment of actuator shaft 2, will preferably extend past the jack nut or actuator. FIG. 8 hereof shows an apparatus of the present invention similar to that shown in FIG. 7 hereof, but where the blind flange actuator is preferably a cylindrical device 55 that is hydraulically, pneumatically, electrical or magnetically operated. Such types of actuators are well known in the art and are used daily worldwide in myriad applications every day around the world. Thus, no further discussion of such devices is needed herein for one having at least ordinary skill in the art to reproduce the apparatus of this invention.

FIG. 9 hereof is a representation of a single forged, cast, machined, or extruded unit comprised of the three integral parts, the slotted rear plate-like section 110, slotted spacer 120, and front plate section 140. As previously mentioned, such a single unit can be produced by any suitable technique in the art. FIG. 9 hereof illustrates a single unit containing three sections 110 (rear slotted section), 120 (spacer section) and 140 (front plate section) which of course corresponds to the individual parts of FIGS. 1-8. FIGS. 9 and 10 also show annular opening 90 for receiving activator rod 2 or 20 as well as treaded holes 100 for receiving corresponding threaded bolts. This figure also shows cavity C for receiving blind flange 16 as previously mentioned.

FIG. 10 hereof shows the opposite face of the unit illustrated in FIG. 9 hereof. This figure also shows cavity C for receiving blind flange 16 as previously mentioned.

FIG. 11 hereof is a side view of the apparatus of FIGS. 9 and 10 hereof showing curved edge 111, cavity C, space 3, and all three plate sections 110, 120, and 140.

What is claimed is:

1. An apparatus for sealing a flanged opening, which apparatus is comprised of:
    a) a circular rear plate section having an elongated slot for receiving a flange of a flanged opening to be sealed wherein said elongated slot is a U-shaped slot extending from the perimeter of said rear plate to past the center so that when a flanged opening is received by said elongated slot said flanged opening is positioned substantially at the center of said rear plate;
    b) a front circular plate section having a through-hole at its' center for receiving a shaft capable of longitudinal movement;
    c) an elongated shaft extending through said through-hole, said shaft having a first end and a second end which first end extends through said through-hole;
    d) a blind flange having a first face and a second face which second face is secured at its center to said first end of said elongated shaft and wherein said front circular plate also contains a circular cavity for receiving said blind flange when the blind flange is retracted;
    e) a C-shaped middle section, which C-shaped middle section is located between and is connected to said circular rear plate section and to said front circular plate section wherein said C-shaped middle section is of a thickness that provides a space between said circular rear plate section and said front circular plate section such that it is capable of receiving the flange of the flanged opening to be sealed and for receiving said blind flange and having sufficient room for the longitudinal movement of said blind flange in and out of contact with the flange of the flanged opening to be sealed, and wherein said C-shaped middle section has substantially the same circumferential diameter as said circular rear plate section and said circular front plate section, and wherein said C-shaped middle section is of a size sufficient for receiving the flange of the flanged opening to be sealed;

f) an actuator secured to said circular front plate, which actuator is capable of horizontally moving said shaft and blind flange so that said blind flange can be moved in and out of contact with said flange of the flanged opening to be sealed; and g) a fluid passageway extending through the longitudinal center of said elongated shaft and through the center of said blind flange which passageway is capable of allowing a fluid to be freely moved through said elongate shaft and through the center of said blind flange.

2. The apparatus of claim 1 wherein there is provided a sealing material in the form of a ring between said blind flange and the flange of the flanged opening to be sealed and wherein the diameter of said sealing material is greater than the diameter of said opening to be sealed, but smaller than the diameter of said blind flange.

3. The apparatus of claim 2 wherein said ring of sealing material is at least partially embedded in a corresponding groove on the said first face of said blind flange.

4. The apparatus of claim 2 wherein said rear plate section, said front circular plate section and said middle section are secured together by use of a suitable securing means.

5. The apparatus of claim 1 wherein said rear plate section, said front circular plate section and said middle section are integral sections of a single unitary piece that is manufacture from a single piece of structural material.

6. The apparatus of claim 5 wherein said single unitary piece is manufactured by a forging technique.

7. The apparatus of claim 5 wherein said single unitary piece is manufactured by a casting technique.

8. The apparatus of claim 5 wherein said single unitary piece is manufactured by a machining technique.

9. The apparatus of claim 1 wherein said actuator is secured to said front circular plate by a plurality of bolts.

10. The apparatus of claim 1 which is constructed of carbon steel.

11. The apparatus of claim 1 wherein all three sections are constructed of a stainless steel.

12. The apparatus of claim 1 wherein all sections are constructed of a high-performance nickel alloy.

13. The apparatus of claim 12 wherein the high-performance nickel alloy is a copper-nickel alloy.

14. The apparatus of claim 1 which is constructed of an aluminum alloy.

15. The apparatus of claim 1 wherein the actuator is activated by hydraulic means.

16. The apparatus of claim 1 wherein the actuator is activated by pneumatic means.

17. The apparatus of claim 1 wherein the actuator is activated by manual means.

18. The apparatus of claim 17 wherein the shaft is a jack screw which is manually operated.

19. The apparatus of claim 1 wherein the sealing material is one or more O-rings embedded in said first face of said blind flange.

* * * * *